United States Patent
Watanabe (10) Patent No.: US 7,327,512 B2
(45) Date of Patent: Feb. 5, 2008

(54) OPTICAL WAVEFORM MONITOR APPARATUS AND OSCILLOSCOPE

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/995,320

(22) Filed: Nov. 24, 2004

(65) Prior Publication Data

US 2006/0018006 A1 Jan. 26, 2006

(30) Foreign Application Priority Data

Jul. 22, 2004 (JP) .............................. 2004-214982

(51) Int. Cl.
  G02F 1/35 (2006.01)
  G02F 2/02 (2006.01)
(52) U.S. Cl. ...................... 359/332; 359/326
(58) Field of Classification Search ........ 359/326–332; 385/326–332
See application file for complete search history.

(56) References Cited

U.S. PATENT DOCUMENTS

| | | | | |
|---|---|---|---|---|
| 3,614,451 | A | | 10/1971 | Gunn .......................... 250/550 |
| 5,574,588 | A | * | 11/1996 | Kawanishi et al. .......... 398/201 |
| 5,604,618 | A | * | 2/1997 | Mori et al. ................... 398/150 |
| 5,706,113 | A | * | 1/1998 | Kawanishi et al. .......... 398/212 |
| 5,798,853 | A | | 8/1998 | Watanabe .................... 398/150 |
| 6,307,984 | B1 | | 10/2001 | Watanabe .................... 385/24 |
| 2003/0043366 | A1 | * | 3/2003 | Ohta et al. ................... 356/121 |
| 2003/0128414 | A1 | * | 7/2003 | Watanabe et al. ........... 359/237 |

FOREIGN PATENT DOCUMENTS

| | | |
|---|---|---|
| EP | 1 130 456 | 9/2001 |
| JP | 7-98464 | 4/1995 |
| JP | W98/08138 | 2/1998 |
| JP | 2003-65857 | 3/2003 |

OTHER PUBLICATIONS

Search Report for corresponding European Appln. No. 05000900.0 dated Nov. 23, 2005, 3 pages.
European Patent Office Communication mailed Jan. 3, 2007, for co-pending European Patent Application No. 05000900.0-2217.

* cited by examiner

*Primary Examiner*—Michelle Connelly-Cushwa
*Assistant Examiner*—Rhonda S. Peace
(74) *Attorney, Agent, or Firm*—Staas & Halsey LLP (57) ABSTRACT

A measured optical pulse and a sampling optical pulse having different wavelengths are input to a nonlinear optical effect, that is, (i) a nonlinear optical medium generating four optical wave mixing or three optical wave mixing, and the optical intensity of the wavelength converted light generated by the four optical wave mixing or four optical wave mixing generated in a common portion in time of the two optical pulses is detected, thereby observing the waveform of a measured light, or (ii) a nonlinear optical medium generating mutual phase modulation which generates mutual phase modulation, and the optical intensity of converted light switched using a phase shift by mutual phase modulation generated in a common portion in time is detected, thereby observing the waveform of measured light.

24 Claims, 9 Drawing Sheets

OPTICAL WAVEFORM MONITOR APPARATUS AND OSCILLOSCOPE

BACKGROUND OF THE INVENTION

1. Field of the Invention

The present invention relates to an optical sampling apparatus for measuring a time waveform of signal light with high precision, and an optical sampling oscilloscope forming part of the optical sampling apparatus.

2. Description of the Related Art

Conventionally, a digital (sampling) oscilloscope has become commercially practical and widespread as an apparatus for observing the time waveform of a transmission signal.

In the digital oscilloscope, the signal intensity of the electric signal which changes in intensity with time is detected at predetermined time intervals, and signal processing for joining in time the signal intensity of the detected electric signal is performed, and the joined time waveform is, for example, displayed on the display screen. Since these processes are electrically performed, the time resolution for detection of the signal intensity of a transmission signal is restricted by the operation speed of electronics.

Furthermore, when the time waveform of signal light of an optical fiber communications system, etc. is observed, a photoreceiver is further included for converting the signal light into an electric signal, and the above-mentioned process is performed on the converted electric signal. In this case, the time resolution for detection of the signal intensity is restricted by the operation speed of the electronics.

Recently, technologies for realizing superfast optical communications have made remarkable progress. At present, a system capable of performing a system for performing superfast optical communications with the transmission speed of 160 Gbit/s has been developed using an ultrashort optical pulse in or within 1 picosecond.

In developing the above-mentioned superfast optical communications system, for example, when the performance of the system is verified, it is necessary to prepare an apparatus capable of observing the time waveform of signal light with high precision.

Using the above-mentioned oscilloscope, the processes of electrical time sharing, detection of signal intensity, etc. are performed after temporarily converting signal light into an electric signal. Therefore, satisfactory time resolution cannot be obtained in the time waveform observation of not only signal light having the transmission speed of 160 Gbit/s, but also signal light having the transmission signal of 10~40 Gbit/s. As a result, a time resolution limit is proposed.

Thus, an optical sampling system for optically sampling signal light has been developed as the technology of overcoming the time resolution limit caused by the operation speed limit of the electronics, and an optical sampling oscilloscope which adopts the above-mentioned system is being commercially practical.

The optical sampling oscilloscope inputs signal light having an iterative frequency and sampling pulse light having an iterative frequency a little different by an integral submultiple of the iterative frequency (several 100 HZ or some kHz) to a nonlinear optical crystal, and detects the optical intensity of the sum (or difference) frequency light output under the second-order nonlinear optical effect from the nonlinear optical crystal. At this time, the pulse width of the sampling pulse light is generated such that it can be sufficiently smaller than the pulse width of the signal light and can be synchronous with the pulse width of the signal light, thereby receiving the sum (or difference) frequency light and observing the time waveform having the time resolution of picosecond (for example, refer to document 1).

[document 1] Japanese Patent Laid-open Publication No. 2003-65857 (paragraph "0020"-"0022", FIG. 2).

However, the conventional sampling oscilloscope has been configured such that, as described above, the time waveform of an optical signal can be detected by receiving the sum (or difference) frequency light the sum (or difference) frequency light caused by the second-order nonlinear optical effect of the nonlinear optical crystal. However, the generation efficiency of the sum (or difference) frequency light generated by the second-order nonlinear optical effect is very small.

Therefore, there has the problem that a very strong power of sampling pulse light has to be input to the nonlinear optical crystal so as to generate the sum (or difference) frequency light having sufficiently high intensity to detect the time waveform of signal light.

Additionally, since the S/N ratio (signal-to-noise ratio) of the sum (or difference) frequency light generated through a nonlinear optical crystal is considerably degraded, the noise is amplified when a signal is amplified based on the sum (or difference) frequency light, thereby failing in detecting the time waveform of the signal light with high precision.

SUMMARY OF THE INVENTION

The present invention has been developed to solve the above-mentioned problems, and aims at providing an optical sampling apparatus capable of detecting with high precision the time waveform of signal light transmitted in high-speed optical communications, an optical sampling oscilloscope forming part of the optical sampling apparatus, and an optical sampling method for use with the optical waveform monitor apparatus.

The present invention adopts the following configuration to solve the above-mentioned problems.

First, a measured optical pulse and a sampling optical pulse having different wavelengths are input to a nonlinear optical effect, that is, (i) a nonlinear optical medium generating four optical wave mixing, and the optical intensity of the wavelength converted light generated by the four optical wave mixing generated in a common portion in time of the two optical pulses is detected, thereby observing the waveform of a measured light, or (ii) a nonlinear optical medium generating mutual phase modulation which generates mutual phase modulation, and the optical intensity of converted light switched using a phase shift by mutual phase modulation generated in a common portion in time is detected, thereby observing the waveform of measured light.

Second, in the description above, the sampling light is arranged at the end of a signal band containing measured light or in a signal band different from a band containing measured light, and the sampled and converted light is generated in a signal band different from the band containing the measured light or in a band containing the measured light.

In the above-mentioned means, the optical sampling having high resolution and high S/N ratio can be realized.

That is, according to the first aspect of the present invention, the optical sampling apparatus according to the present invention is an optical sampling apparatus for detecting the time waveform of signal light, and includes: an optical pulse train generation circuit for generating an optical pulse train having an iterative frequency displaced by a predetermined time from an integral multiple or an integral submultiple of synchronous time interval of a synchronous signal of the signal light; an optical Kerr effect generation circuit for inputting the signal light and the generated optical pulse train outputting the optical intensity of the signal light overlapping the optical pulse train in time under the optical Kerr effect; and an optical circuit for retrieving the light at a frequency determined depending on the type of the optical Kerr effect from the light output from the optical Kerr effect generation circuit.

According to another aspect of the present invention, the optical sampling apparatus according to the present invention is an optical sampling apparatus having an optical AND circuit for multiplexing the signal light with the optical pulse train having an iterative frequency different from the signal light, and generating wavelength converted pulse light having intensity varying with the signal intensity of the portion overlapping in time with the optical pulse train in the signal light, and the signal light and the wavelength converted pulse light have wavelengths of different wavelength bands.

According to a further aspect of the present invention, the optical sampling apparatus according to the present invention is an optical sampling apparatus having an optical AND circuit for multiplexing the signal light with the optical pulse train having an iterative frequency different from the signal light, and generating wavelength converted pulse light having intensity varying with the signal intensity of the portion overlapping in time with the optical pulse train in the signal light, and the signal light and the optical pulse train have wavelengths of different wavelength bands.

It is desired that the optical AND circuit uses the optical pulse train as the pumping light for generation of four optical wave mixing in the optical sampling apparatus according to the present invention.

It is also desired that the optical AND circuit uses the optical pulse train as the control light for generation of mutual phase modulation in the optical sampling apparatus according to the present invention.

It is also desired that the optical sampling apparatus according to the present invention further includes an optical fiber as nonlinear optical medium, and the optical fiber substantially matches the wavelength of the pumping light in wavelength of zero variance over the necessary length required to generate the four optical wave mixing with sufficient efficiency.

Furthermore, it is desired that the optical sampling apparatus according to the present invention uses an optical fiber as a nonlinear optical medium, and the optical fiber is constant in wavelength variance over a necessary length required in generating the mutual phase modulation with sufficient efficiency.

It is also desired that the optical fiber is a highly linear optical fiber having high generation efficiency of the third-order nonlinear optical effect per unit length by doping the core with germanium, bismuth, etc. and controlling the refractive index ratio between the core and cladding in the optical sampling apparatus according to the present invention.

It is further desired that the optical fiber is a photonic crystal fiber with the generation efficiency of the third-order nonlinear optical effect per unit length in the optical sampling apparatus according to the present invention.

Furthermore, it is desired that the optical AND circuit uses an optical Kerr switch or a nonlinear optical loop mirror using the mutual phase modulation in the optical fiber in the optical sampling apparatus according to the present invention.

DESCRIPTION OF THE PREFERRED EMBODIMENTS

The embodiments of the present invention are explained below by referring to the attached drawings.

Figure 1:
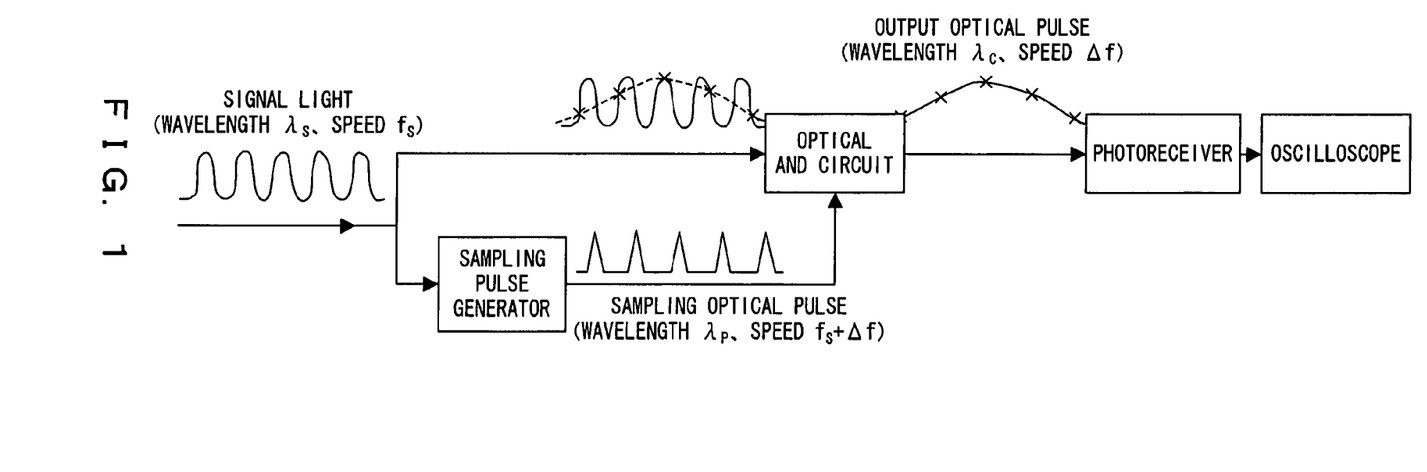
FIG. 1 shows the basic configuration of the present invention.

FIG. 1 shows the basic configuration of the present invention.

The signal light having the wavelength $\lambda_s$ and speed $f_s$ is input to the optical AND circuit together with the sampling light having the wavelength $\lambda_p$ frequency $f_s+\Delta f$, and the converted light pulse of the wavelength c speed $\Delta f$ is output using the nonlinear optical effect.

The sampling pulse generator for generating the sampling light extracts the clock signal of the reference frequency $f_s$ using the clock regenerator from a part of the signal light, and an optical pulse train synchronous with the frequency (difference $\Delta f$) a little different from the extracted clock signal is generated by the pulse light source. The frequency difference $\Delta f$ is a frequency ($\Delta f<<f_s$) sufficiently lower than the $f_s$, and the optical AND circuit sequentially outputs an optical pulse varying with the optical intensity according to the shape of the signal pulse.

By sequentially joining the peaks of the output optical pulses, the optical pulse shape can be obtained at the iterative frequency $\Delta f$. The optical pulse reflects the shape of the signal light based on the generation principle, and by converting the optical pulse into an electric signal by the photoreceiver, the waveform observation of short pulses beyond the operation speed limit of an electronic circuit can be realized using an oscilloscope.

In the present invention, a nonlinear optical gate, etc. using the optical Kerr effect such as the four optical wave mixing (FWM), the mutual phase modulation (XPM), etc. is used as an optical AND circuit. Especially, according to the present invention, the ultrafast and ultrawide band characteristic of the nonlinear optical effect are intensively regarded, and a wavelength arrangement for realization of an optical sampling in which the entire signal light having the wavelength contained in the wavelength band used in the optical communications system, and a method for realizing the optical sampling in the broad band can be provided.

An optical AND circuit can be an optical switch using an XPM such as a nonlinear optical loop mirror (NOLM), an optical Kerr switch, etc., or an optical switch, etc. using the four optical wave mixing. The nonlinear optical loop mirror comprises a directionally coupled first optical coupler including first and second optical paths; a loop optical path for connecting first and second optical paths; and a second optical coupler including the third optical path directionally coupled to the loop optical path.

A converted light signal is output from the second optical path by configuring all or a part of the loop optical path by the nonlinear optical medium and providing probe light and an optical signal for the first and third optical paths.

An optical fiber is normally used as the nonlinear optical medium in the nonlinear optical loop mirror. Especially, the NOLM using the SOA as a nonlinear optical medium is referred to as a SLALOM (semiconductor laser amplifier in a loop mirror).

The optical AND circuit can perform an operation such as demultiplexing, etc. of an OTDM (optical time division multiplexing) signal by setting the frequency of a clock pulse as a frequency divisional multiple (for example, 10 GHz when the signal speed is 40 Gb/s) of the signal speed.

Furthermore, when the optical Kerr effect is used as a nonlinear optical effect, γPL (γ indicates a nonlinear coefficient of the nonlinear optical medium, P indicates the optical power in the nonlinear optical medium, and L indicates the interaction length of the optical Kerr effect (phenomenon in which the refractive index of the medium varies with the square of the field of incident light) in the nonlinear optical medium NL) which is the amount of nonlinear phase shifts indicates the generation efficiency.

Since the response time of the third-order nonlinear optical effect in the optical fiber is shorter than femtosecond ($10^{-15}$ second) indicating a very high speed, ultrahigh and ultrawide signal processing exceeding several 10 Tb/s can be expected. To effectively realize the nonlinear interaction between the optical pulses in the optical fiber, the management of the wavelength variance is particularly important because the walk-off between the optical pulses has to be minimized in the optical switch by the mutual phase modulation (XPM) for phase consistency in the four optical wave mixing (FWM). The variance shift fiber (DSF) whose value of the wavelength variance is minimized is used, but it is important to manage with high precision the wavelength of zero variance $\lambda_0$ in the fiber.

The nonlinear phase shift $\phi_{NL}$ in the fiber having the length L and loss α is approximated by the following equation 1.

$$\phi_{NL} = \gamma PL \quad \text{equation 1}$$

where P indicates the input signal light power, $L=(1-e^{\alpha L})/\alpha L/\alpha L$ indicates the nonlinear interaction length.

$$\gamma = \omega n_2/cA_{eff} \quad \text{equation 2}$$

where γ indicates a 3-dimensional nonlinear constant (in ($W^{-1}$ $km^{-1}$) unit), and $n_2$ and $A_{eff}$ indicate the nonlinear refractive index and the effective core sectional area.

By the equation 1, for example, to realize the π phase shift using, for example, the fiber of 300 m long, the nonlinear optical effect of about γ~10/P is required. Using P~100 mW, the fiber having the y value of about 100 $W^{-1}$ $km^{-1}$ is to be developed as a target.

On the other hand, as clearly shown by the equation 2, the power density is basically improved by reducing the radius of the mode field, and the refractive index of the core is increased, thereby improving the nonlinear optical effect. These effects are confirmed by the highly-nonlinear fiber (HNLF) (the core is doped with $GeO_2$), and the γ value exceeding 20 $W^{-1}$ $km^{-1}$ is realized.

This value is about ten times as large as a normal DSF, and can realize a large phase shift using the length of about 1~2 km in the HNLF.

To further increase the generation efficiency of the nonlinear optical effect, a method of using chalcogenide glass fiber has been proposed, and it proves that the value of $n_2$ about 30 times as large as normal silica fiber can be realized Lately, a sample of γ=640 $W^{-1}$ $km^{-1}$ using the photonic crystal fiber (PCF), and a sample of y=1360 $W^{-1}$ $km^{-1}$ using bismuth glass oxide has been reported.

Using the fiber having the above-mentioned large nonlinear characteristics, there is the possibility that the signal processing can be successfully performed using a very short length of several 10 m. When the required length can be reduced, it is convenient in the management in the longitudinal direction of the wavelength of zero variance.

The details of the method for using a nonlinear optical loop mirror (NOLM) and an optical Kerr switch is disclosed by Japanese Patent Laid-open Publication No. 2001-249371 and Japanese Patent Laid-open Publication No. 2003-209515, and the contents described in these publications are the same as those described in the present specification.

Figure 2:
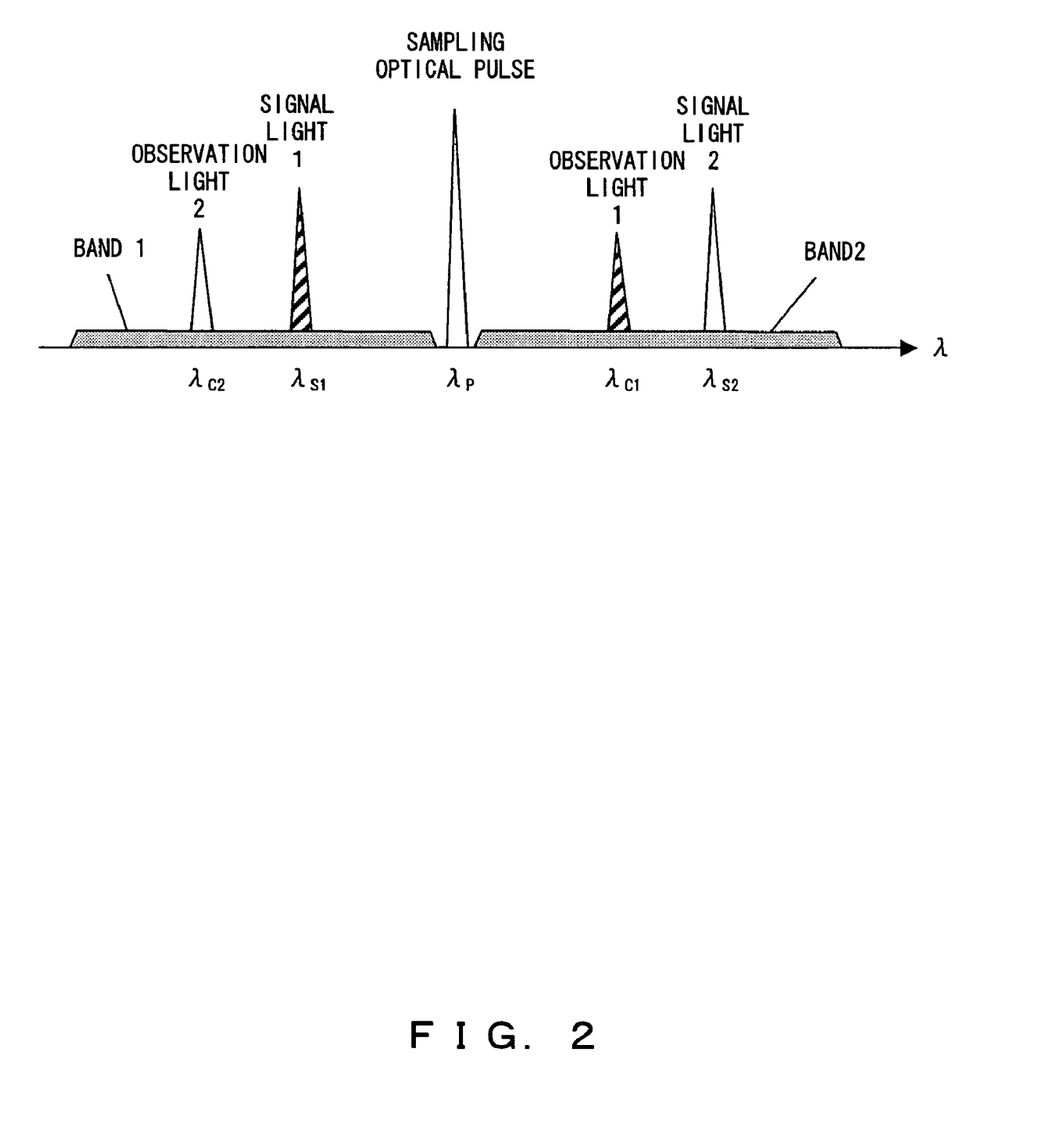
FIG. 2 shows the first wavelength arrangement of the optical sampling according to the first embodiment of the present invention.

FIG. 2 shows the first wavelength arrangement of the optical sampling according to the first embodiment of the present invention.

Assume that there are two wavelength bands which can be observed. For example, they are a visible light band and a infrared band, or a C-band and an L-band for optical communications.

When the signal light of a wavelength contained in one of the above-mentioned two bands is observed, in the first case as shown in FIG. 2, the sampling optical pulse is prepared around the center between the two wavelength band, the signal light and the sampling optical pulse are input to the nonlinear optical medium to be wavelength-converted into another wavelength band, and the wavelength converted light is observed, thereby successfully performing a waveform observation.

When the optical AND circuit uses the nonlinear optical wave mixing such as the four optical wave mixing (FWM), three optical wave mixing (TWM), etc., the above-mentioned wavelength arrangement is used. In this case, "around the center" refers to the end or the outside of the signal band including the measured light, or the portion near the end of the signal band containing the measured light in the signal bands other than the band including the measured light.

Normally, the waveform observation requires an optical amplifier, an optical filter, a photoreceiver, an electronic circuit for amplifying the photo-electrically converted signal, etc., but particularly optical measuring tools are relatively expensive. Therefore, they are normally provided for each wavelength band.

Using the above-mentioned wavelength arrangement, it is possible to observe the waveforms of all signal light in the wavelength band to be observed using a set of observation tools. According to the present embodiment, the signal light of the second wavelength band can be observed by setting the first signal band as an observation band.

Figure 3:
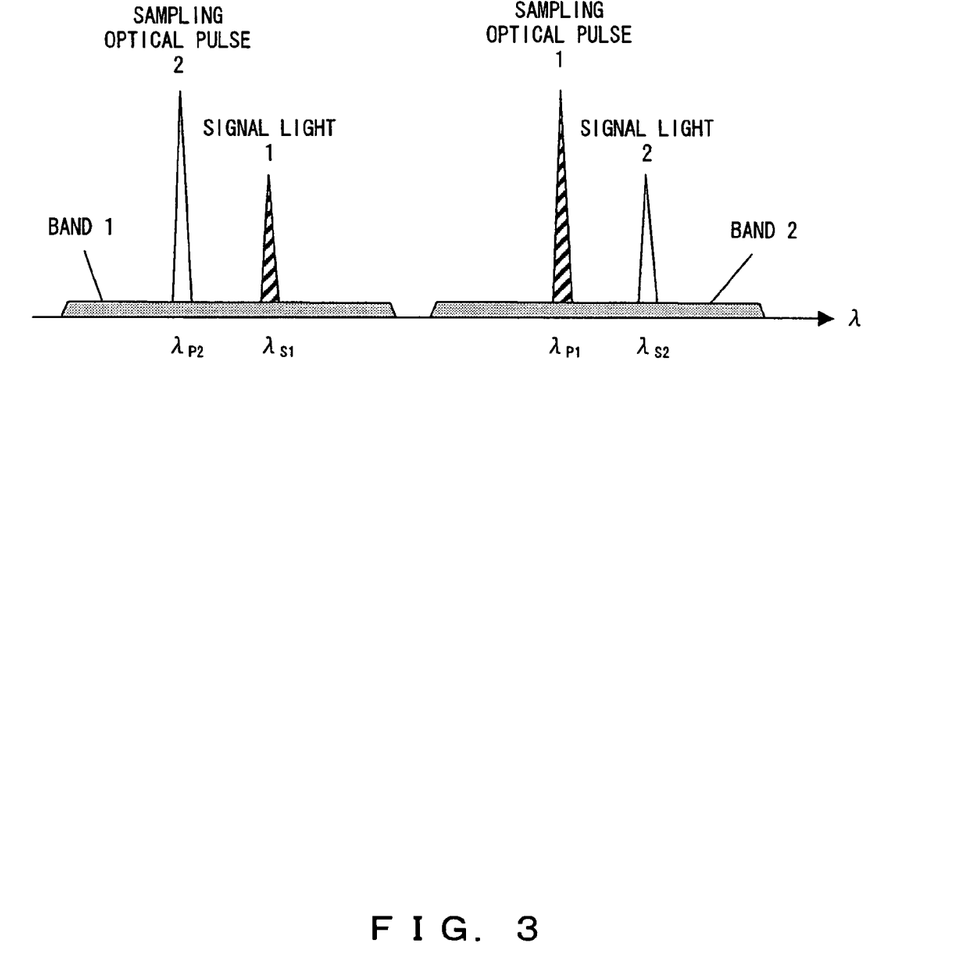
FIG. 3 shows the second wavelength arrangement (1) of the optical sampling according to the second embodiment of the present invention.
Figure 4:
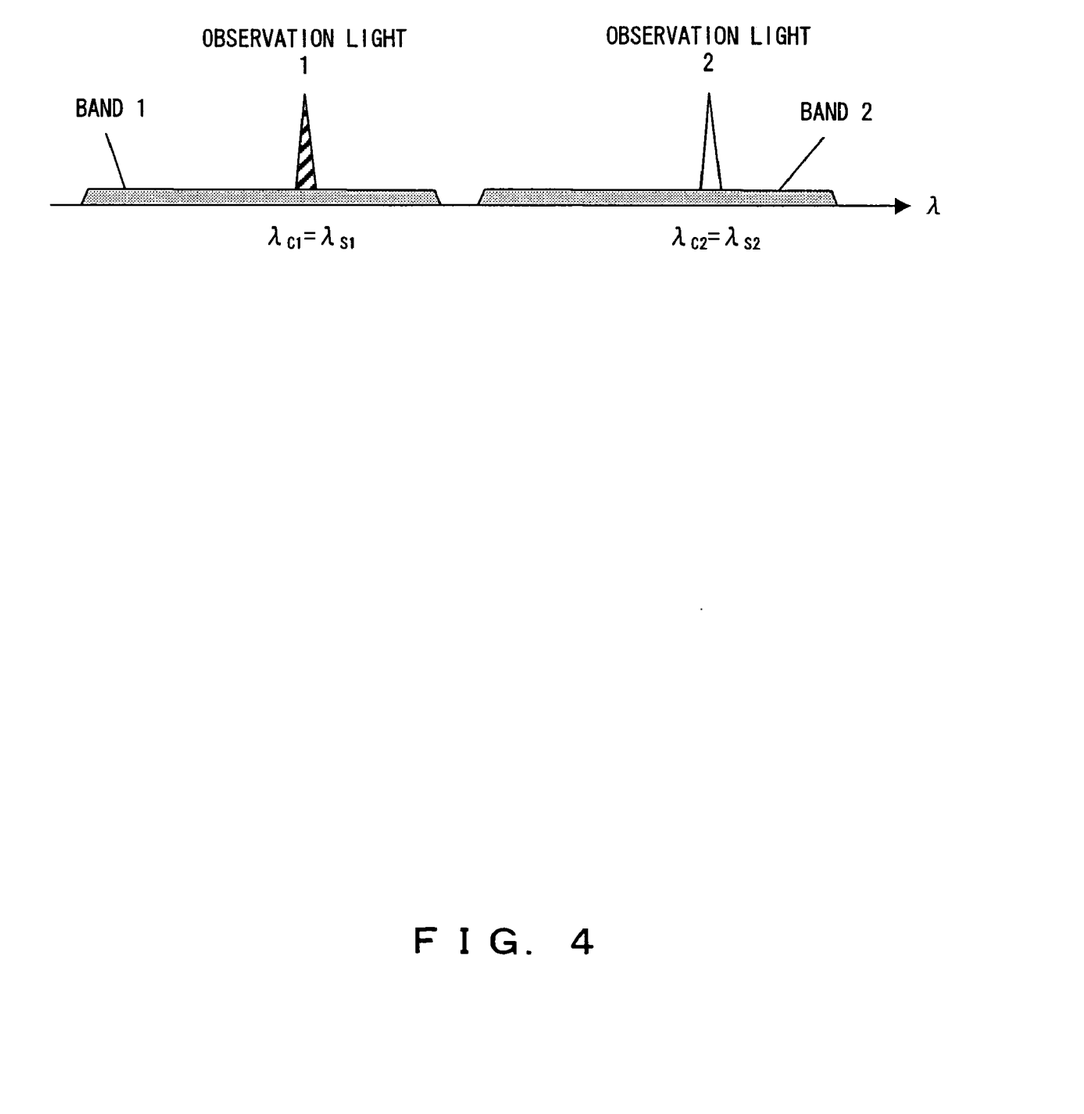
FIG. 4 shows the second wavelength arrangement (2) of the optical sampling according to the second embodiment of the present invention.

FIGS. 3 and 4 show second wavelength arrangement of the optical sampling in the second embodiment of the present invention.

As the second embodiment of the present invention, an optical Kerr switch by the mutual phase modulation (XPM) in the optical fiber and an optical gate such as a NOLM are used as the nonlinear optical effect for the optical AND circuit. In this case, as shown in FIG. 3, the signal light and the sampling optical pulse are arranged in different wavelength bands. As shown in FIG. 4, signal light and converted light having the same wavelength as the signal light can be observed.

In this case, by preparing the sampling optical pulse in a wavelength b and different from the wavelength band of the signal light, the observation light can be generated in the same wavelength band as the signal light. Therefore, the observation light and the signal light can be observed in the ultrafast observation using the same measuring tools.

Described below is the practical method for realizing the optical sampling in the above-mentioned wavelength arrangement.

Figure 5:
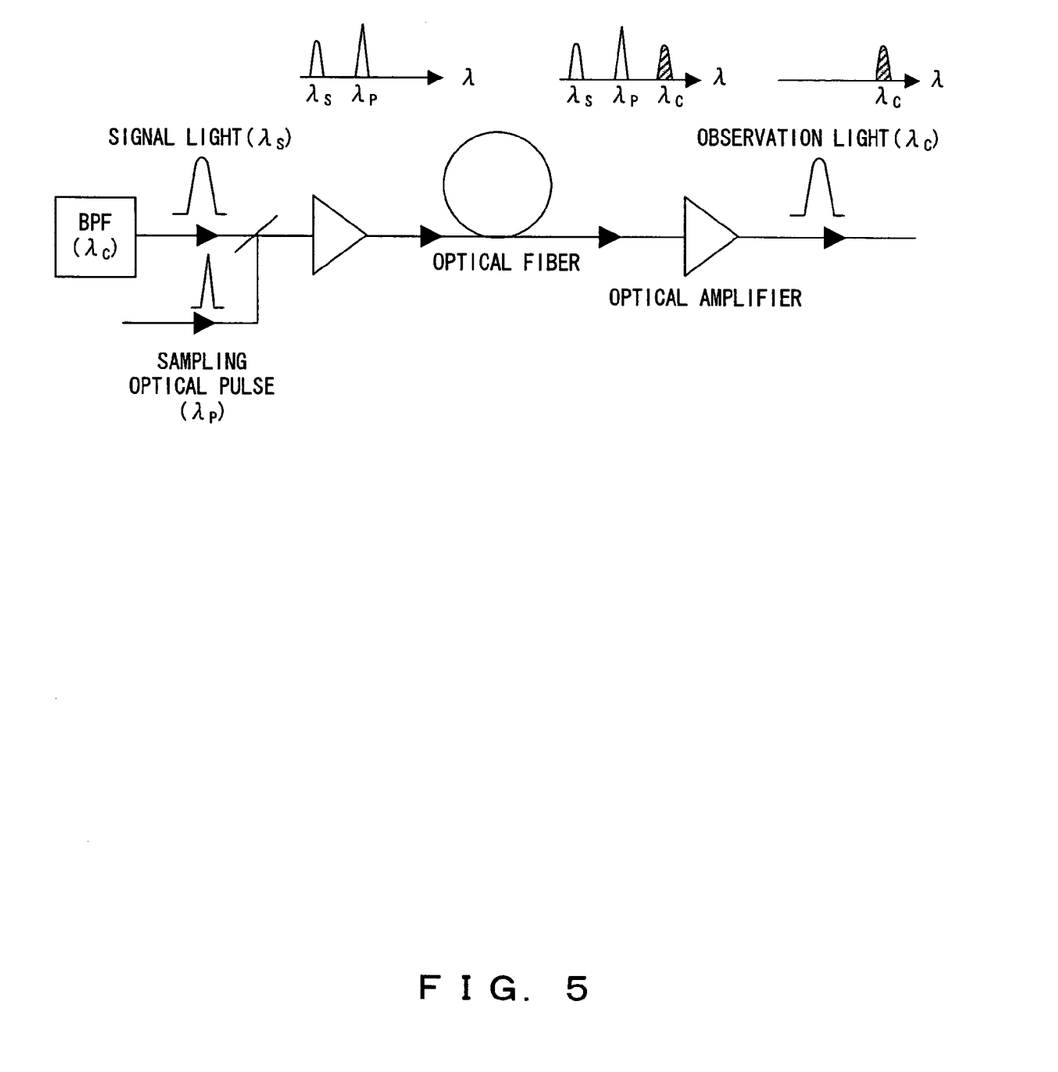
FIG. 5 is an explanatory view showing an example of the configuration of the optical gate using the four optical wave mixing in the optical fiber according to the third embodiment of the present invention.

FIG. 5 is an explanatory view showing an example of the configuration of the optical gate using the four optical wave mixing in the optical fiber according to the third embodiment of the present invention.

In the present embodiment, an optical fiber is used as a device for generating a nonlinear optical effect. The optical fiber to be used is assumed to be available in the four optical wave mixing over two bands using the pumping light of the wavelength $\lambda_p$.

A preferred example of the above-mentioned optical fiber can be optical fiber with an improved nonlinear optical effect such as highly-nonlinear fiber, photonic crystal fiber, bismuth substitute fiber, etc. A nonlinear device other than the optical fiber can be a semiconductor optical amplifier and a quantization dot optical amplifier for the four optical wave mixing, $LiNbO_3$ (periodically poled LN (PPLN)) of the pseudo phase consistent structure for the three optical wave mixing, etc.

To realize the four optical wave mixing over a sufficiently broad band covering two bands, it is necessary to maintain the phase consistency between the signal light (wavelength $\lambda_s$) and the observation light (wavelength $\lambda_c$). The details of the necessary conditions are disclosed by Japanese Patent Publication No. 3419510 and Japanese Patent Publication No. 3494661. The contents described in these patent publications and the related laid open publications (Japanese Patent Laid-open Publication No. Hei 7-98464 and International Patent Laid-open Publication WO 98/8183) are the same as those described in the specifications of the present invention.

Figure 6:
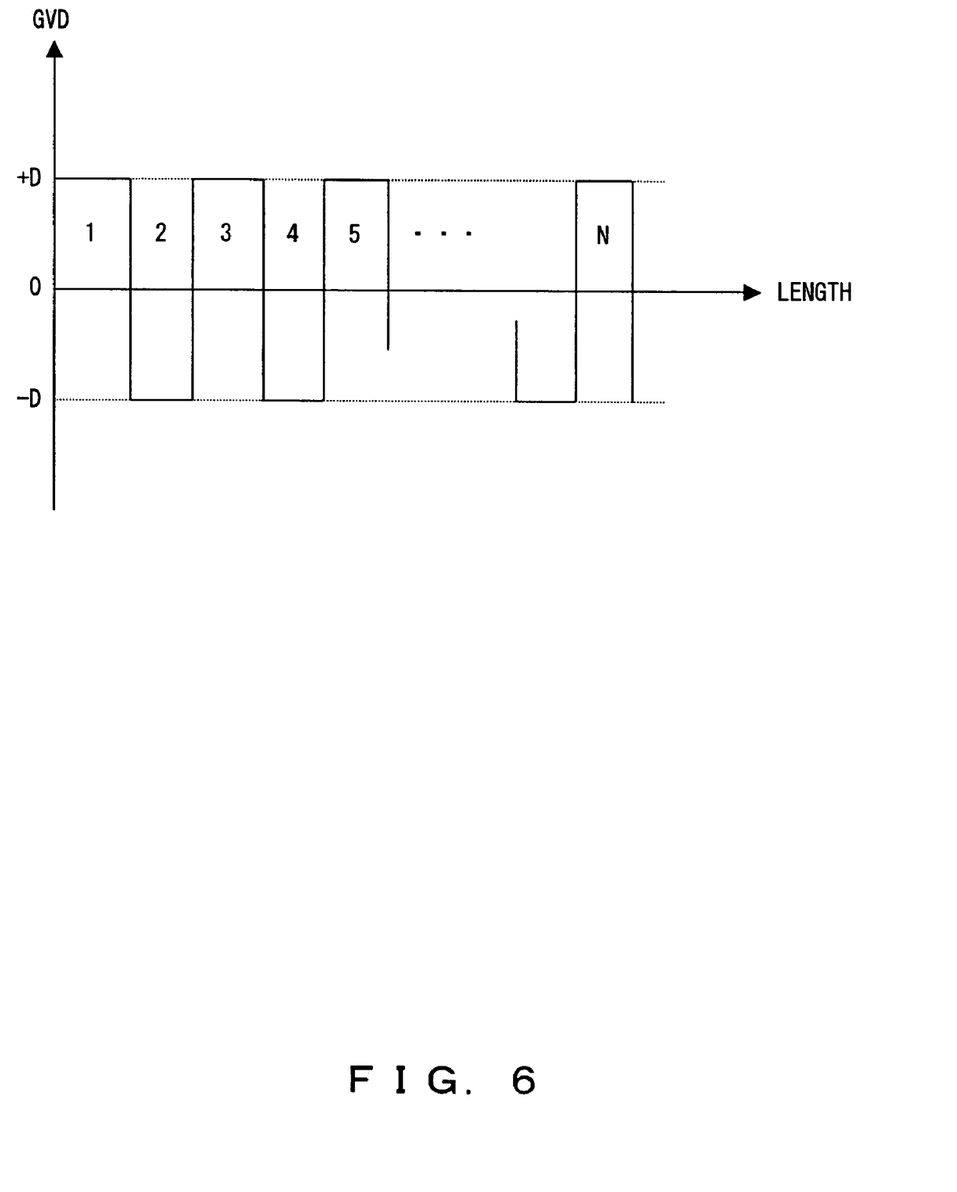
FIG. 6 shows an example of the variance control in the optical fiber for realization of the present invention.

FIG. 6 shows an example of the variance control in the optical fiber for realization of the present invention.

FIG. 6 shows an example in which a plurality of fibers different in symbol of wavelength variance are sequentially arranged such that the average variance can be zero, thereby reserving the phase consistency between the signal light and the observation light. In the sufficiently large (for example, such as the latest bismuth substitute fiber, etc.) nonlinear fiber, a requires length is short. Therefore, it can be possible to generate the four optical wave mixing with sufficient high efficiency although the value of the wavelength variance is large. In this case, for example, it is possible to generate the four optical wave mixing with high efficiency by variance compensation using, for example, variance control.

In the case shown in FIG. 5, optical fiber having a large nonlinear optical effect is arranged in the portions of, for example, N=1, 3, 5, . . . , and fiber for variance compensation of the nonlinear fiber is arranged in the portions of N=2, 4, 6, . . . .

For example, in the case where the bismuth substitute fiber of the third-order nonlinear constant 1000 (1/W/km) is used, when the peak power generates the four optical wave mixing using the sampling optical pulse of 1 W, the observation light can be generated with the conversion efficiency of almost 100% using the fiber of the total length of 11 m. Therefore, although the wavelength variance of the fiber is, for example, −200 (ps/nm/km), the total amount of wavelength variance is 0.2 ps/nm. Therefore, the variance compensation for every 50 cm can maintain the influence of the wavelength variance down to 0.1 ps/nm on an average. Furthermore, to be precise, to reserve 100 nm for the band of the four optical wave mixing, and to suppress the delay difference with the wavelengths 100 nm separate at 2 ps or less, the variance compensation at 10 cm intervals will do.

The four optical wave mixing has been used as the nonlinear optical effect for the optical AND circuit, but an optical gate such as an optical Kerr switch by the mutual phase modulation (XPM) in the optical fiber, the NOLM, etc. can also be used. In the case of the optical gates, it is effective to use the wavelength arrangement as shown in FIGS. 3 and 4.

The fourth embodiment of the present invention is explained as the case in which the optical Kerr is used as an optical gate.

Figure 7:
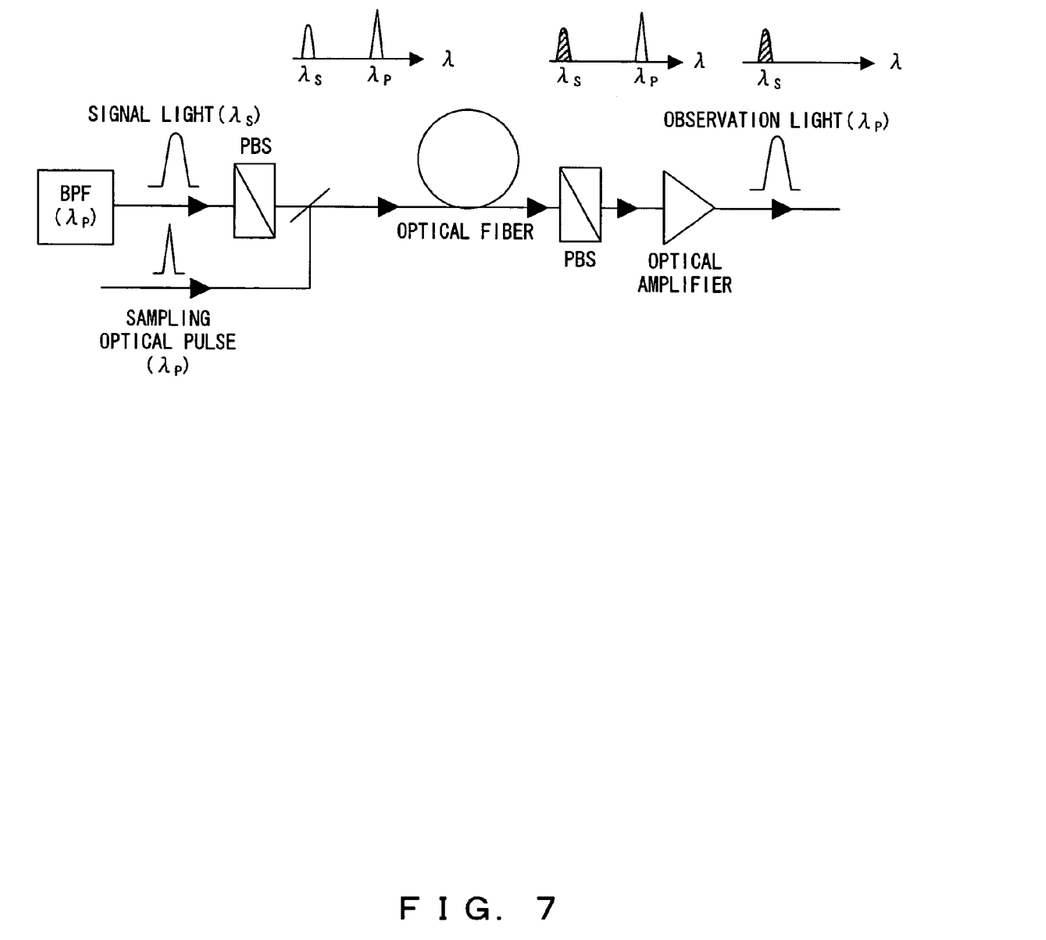
FIG. 7 is an explanatory view of the configuration of the optical gate using the optical Kerr switch by the mutual phase modulation in the optical fiber according to the fourth embodiment of the present invention.

FIG. 7 shows configuration according to the fourth embodiment of the present invention, that is, the optical gate using an optical Kerr switch by the mutual phase modulation in the optical fiber.

The output wavelength of the observation light matches a normal signal light $\lambda_s$. However, there can be the case in which the wavelength is first shifted to an optional wavelength. In this case, the wavelength of the observation light is a signal wavelength $\lambda_s$.

Explained below is the fifth embodiment of the present invention as a case in which the NOLM is used as an optical gate.

Figure 8:
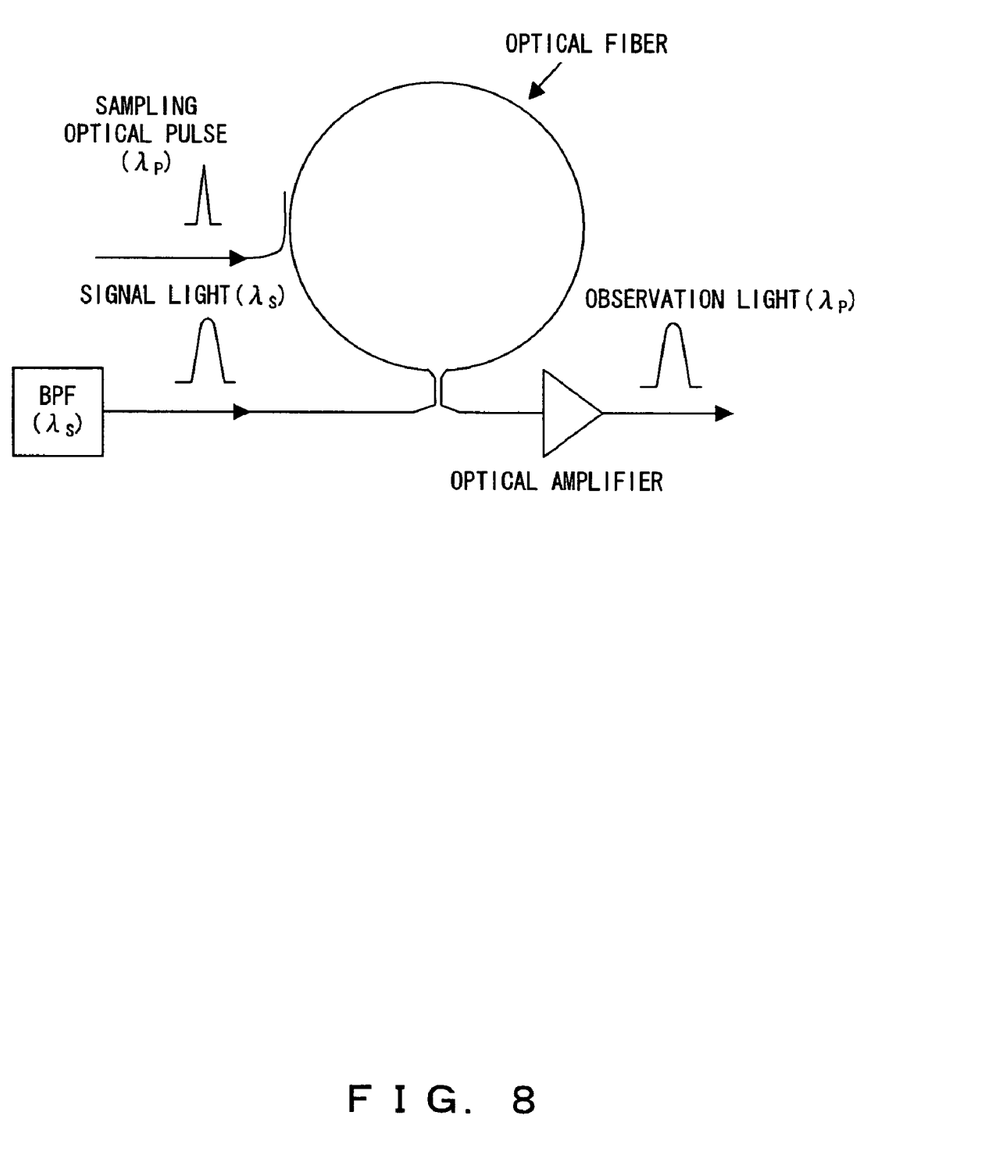
FIG. 8 is an explanatory view of the configuration of the optical gate using the nonlinear optical loop mirror by the mutual phase modulation in the optical fiber according to the fifth embodiment of the present invention.

FIG. 8 shows configuration according to the fifth embodiment of the present invention, that is, the optical gate using an nonlinear loop mirror by the mutual phase modulation in the optical fiber.

In the NOLM, since the timing light different from the sampling optical pulse which is control light is totally reflected, there is the advantage that, for example, excess amounts of naturally emitted optical components can be suppressed.

In the fourth and fifth embodiments shown in FIGS. 7 and 8, it is necessary to minimize the walk-off of the signal light and the sampling optical pulse. In this case, the variance is to be minimized.

The method of arranging the wavelengths of the signal light and the probe light in a normal variance area, the method of arranging them as abnormal variance, the method of arranging the two wavelengths as symmetric about the zero variance which is the method of minimizing the walk-off, the method of using variance flat fiber, the method of using variance compensation, etc. can be used to reduce the walk-off. These methods are basically the same as the other optical gates using optical fiber, and is disclosed by, for example, Japanese Patent Laid-open Publication No. 2003-107541. The contents described in the publication is assumed to be the same as those described in the specifications of the present invention.

Figure 9:
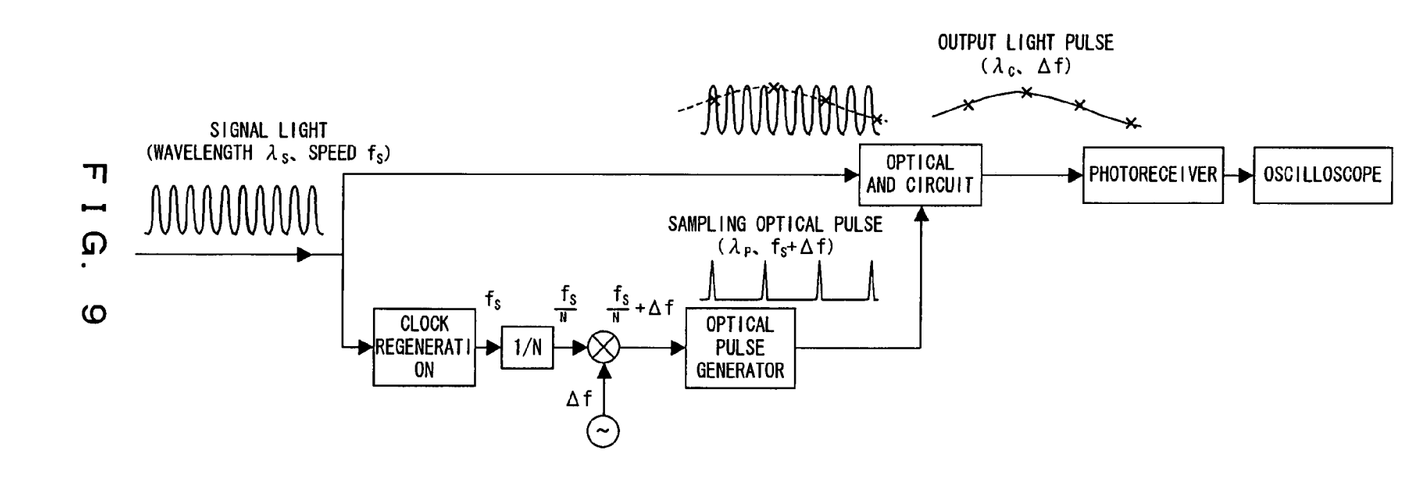
FIG. 9 is an explanatory view showing an example of a practical optical sampling according to the sixth embodiment of the present invention.

FIG. 9 is an explanatory view showing a practical example of the optical sampling according to the sixth embodiment of the present invention.

The example of the configuration shown in FIG. 9 is a practical optical sampling oscilloscope to which the present invention is applied.

The level of the iterative frequency (tracing speed of sampling) required in the optical sampling indicates the sufficient speed required for waveform observation. Normally, the iterative frequency of kHz through MHz guarantees the sufficient speed.

Therefore, as shown in FIG. 2, it is not necessary to obtain the superhigh sampling of sequential extraction from all pulses using an optical AND circuit. Therefore, in FIG. 9, a clock signal of $f_s$ is first extracted, and the sampling is performed at the iterative frequency with the frequency division of an integral submultiple of $f_s$, for example, the frequency division of 10 HGz into 32, 64, etc.

An optical pulse train synchronous with the frequency (difference $\Delta f$) a little different from the extracted clock signal is generated by the pulse light source. The frequency difference $\Delta f$ is a frequency ($\Delta f<<f_s/N$) sufficiently lower than the $f_s/N$.

Thus, the sampling optical pulse of the generated wavelength $\lambda_p$ is input to the optical AND circuit together with the signal light of wavelength $\lambda_s$, and the converted light pulse of the wavelength $\lambda_c$ is output. By sequentially joining the peaks of the output optical pulses, the optical pulse shape can be obtained at the iterative frequency $\Delta f$. The optical pulse reflects the shape of the signal light based on the generation principle, and by converting the optical pulse into an electric signal by the photoreceiver, the waveform observation of short pulses beyond the operation speed limit of an electronic circuit can be realized using an oscilloscope.

A sampling optical pulse according to the present embodiment can be generated by any pulse generator of the waveguide type modulator, etc. of a semiconductor or fiber mode-locked laser, an oversaturated optical modulator, $LiNbO_3$, etc.

Furthermore, an clock regenerator regenerates a clock pulse at reference time intervals from the signal light out of order in time intervals. For example, in the case of the signal light of 160 Gbit/s, a pulse train of 160 GHz at 6.25 ps intervals.

Methods of oscillating a mode-locked laser (MLL) using an electrical RF signal by electrically regenerating timing after O/E conversion, generating a regenerated optical pulse by an EA modulator, oscillating an MLL without conversion into an electric signal, etc. are used. However, when a high-speed signal of, for example, 160 Gbit/s is used, the operation speed limit of electronics is exceeded, and there is no pulse optical source operating at such a high speed. Therefore, after regenerating a pulse train of a lower speed, for example, 10 through 40 GHz, a clock pulse of 160 GHz can be generated by the time division multiplex (OTDM) system as necessary.

As an optical clock regenerator to which the present invention is applied, after converting an input light signal into an electric signal, any existing technology such as extracting a clock in an electrical circuit, regenerating an optical clock pulse using a mode-locked clock laser and an optical gate element, etc. can be applied.

As described above, the embodiments of the present invention has been explained by referring to the attached drawings, but the apparatus to which the present invention is applied is not limited to the embodiments above so far as the function can be performed. That is, a single apparatus, a plurality of apparatuses, an integrated apparatus, and a system for performing a process through a LAN, a WAN, etc. can be used.

That is, the present invention is not limited to the above-mentioned embodiments, but can be any of the various configurations and shapes within the gist of the present invention. The features of the above-mentioned embodiments are listed below.

According to the present invention, the time waveform of the signal light transmitted over high-speed optical communications can be detected with sufficiently high conversion efficiency.

What is claimed is:

1. An optical sampling apparatus for detecting a time waveform of signal light, comprising:
   an optical pulse train generation circuit generating an optical pulse train having an iterative frequency displaced by a predetermined time from an integral multiple or an integral submultiple of a synchronous time interval of a synchronous signal of the signal light;
   an optical Kerr effect generation circuit inputting the signal light and the generated optical pulse train and outputting optical intensity of the signal light overlapping the optical pulse train in time under an optical Kerr effect; and
   an optical circuit retrieving light at a frequency determined depending on type of the optical Kerr effect from light output from the optical Kerr effect generation circuit, and
   wherein
      said optical pulse train is used as pumping light for generation of four optical wave mixing as the optical Kerr effect
   outputting an optical pulse varying in optical intensity according to the shape of the signal light by sequentially joining the peaks of the output optical pulse at an iterative frequency $\Delta f$.

2. An optical sampling apparatus as in claim 1, wherein the optical sampling apparatus thereby samples the signal light to detect a time waveform of the signal light.

3. An optical sampling apparatus having an optical AND circuit for multiplexing a signal light with an optical pulse train having an iterative frequency different from the signal light, and generating wavelength converted pulse light having intensity varying with signal intensity of a portion overlapping in time with the optical pulse train in the signal light, and the signal light and the wavelength converted pulse light have wavelengths of different wavelength bands, and
   wherein
      said optical AND circuit uses the optical pulse train as pumping light for generation of four optical wave mixing.

4. The apparatus according to claim 3, further comprising a sampling pulse generator generating an optical pulse train from a part of the signal light, wherein
   said optical AND circuit multiplexes another part of the signal light with the regenerated optical pulse train with a shift of a predetermined time, and signal light synchronous with a time in which the other part of the signal light and the regenerated optical pulse train coexist is output.

5. The apparatus according to claim 3, wherein said signal light is obtained after amplifying power by an optical amplifier, and removing naturally emitted light added by the optical amplifier using an optical band filter.

6. An oscilloscope having the optical sampling apparatus according to claim 3, wherein after converting the wavelength converted pulse light into an electric signal by a photoreceiver, peak intensity of the wavelength converted pulse light is electrically traced, thereby observing a time waveform of signal light.

7. An optical sampling apparatus as in claim 3, wherein the optical sampling apparatus thereby samples the signal light to detect a time waveform of the signal light.

8. An optical sampling apparatus having an optical AND circuit for multiplexing a signal light with an optical pulse train having an iterative frequency different from the signal light, and generating wavelength converted pulse light having intensity varying with signal intensity of a portion overlapping in time with the optical pulse train in the signal light, and the signal light and the optical pulse train have wavelengths of different wavelength bands; and
wherein
said optical AND circuit uses the optical pulse train as pumping light for generation of four optical wave mixing.

9. The apparatus according to claim 8, wherein said optical AND circuit uses the optical pulse train as control light for generation of mutual phase modulation.

10. The apparatus according to claim 9, wherein
an optical fiber is provided as a nonlinear optical medium; and
said optical fiber is constant in wavelength variance over a necessary length required to generate the mutual phase modulation with sufficient efficiency.

11. The apparatus according to claim 10, wherein said optical fiber is a highly linear optical fiber having high generation efficiency of a third-order nonlinear optical effect per unit length by doping a core with germanium, bismuth, and controlling a refractive index ratio between the core and cladding.

12. The apparatus according to claim 10, wherein said optical fiber is a photonic crystal fiber.

13. The apparatus according to claim 10, wherein said optical AND circuit uses an optical Kerr switch or a nonlinear optical loop mirror using mutual phase modulation in the optical fiber.

14. The apparatus according to claim 8, wherein:
an optical fiber is provided as a nonlinear optical medium; and
said optical fiber substantially matches a wavelength of the pumping light in wavelength of zero variance over a necessary length required to generate the four optical wave mixing with sufficient efficiency.

15. The apparatus according to claim 14, wherein
said optical fiber is a highly linear optical fiber having high generation efficiency of a third-order nonlinear optical effect per unit length by doping a core with germanium, bismuth, and controlling a refractive index ratio between the core and cladding.

16. The apparatus according to claim 14, wherein said optical fiber is a photonic crystal fiber.

17. The apparatus according to claim 8, further comprising:
a sampling pulse generator generating an optical pulse train from a part of the signal light, wherein said optical AND circuit multiplexes another part of the signal light with the regenerated optical pulse train with a shift of a predetermined time, and signal light synchronous with a time in which the other part of the signal light and the regenerated optical pulse train coexist is output.

18. The apparatus according to claim 8, wherein said signal light is obtained after amplifying power by an optical amplifier, and removing naturally emitted light added by the optical amplifier using an optical band filter.

19. An oscilloscope having the optical sampling apparatus according to claim 8, wherein after converting the wavelength converted pulse light into an electric signal by a photoreceiver, peak intensity of the wavelength converted pulse light is electrically traced, thereby observing a time waveform of signal light.

20. An optical sampling apparatus as in claim 8, wherein the optical sampling apparatus thereby samples the signal light to detect a time waveform of the signal light.

21. An apparatus comprising:
an optical AND circuit multiplexing a signal light with an optical pulse train having an iterative frequency different from the signal light, wherein the signal light and the wavelength converted pulse light have wavelengths of different wavelength bands, and the optical AND circuit uses the optical pulse train as pumping light to generate four optical wave mixing and thereby generates a wavelength converted pulse light having intensity varying with signal intensity of a portion overlapping in time with the optical pulse train in the signal light.

22. An apparatus as in claim 21, wherein the apparatus is an optical sampling apparatus to sample the signal light and thereby use the converted pulse light to measure a time waveform of the signal light.

23. An apparatus comprising:
means for multiplexing a signal light with an optical pulse train having an iterative frequency different from the signal light, wherein the signal light and the wavelength converted pulse light have wavelengths of different wavelength bands, and said means uses the optical pulse train as pumping light for generating four optical wave mixing and thereby for generating a wavelength converted pulse light having intensity varying with signal intensity of a portion overlapping in time with the optical pulse train in the signal light.

24. An apparatus, comprising:
a sampling pulse generation unit generating an optical pulse train from a signal light, the optical pulse train having a frequency of $f_s+\Delta f$, where $f_s$ is the frequency of the signal light and $\Delta f$ is a frequency output using a nonlinear optical effect; and
an optical AND unit inputting the signal light and the generated optical pulse train and sequentially outputting an optical pulse varying in optical intensity according to the shape of the signal light by sequentially joining the peaks of the output optical pulse at the frequency $\Delta f$, thereby enabling waveform observation of pulses beyond the observation speed limit of an electronic circuit.

* * * * *